(12) United States Patent
Coleman et al.

(10) Patent No.: US 6,321,537 B1
(45) Date of Patent: Nov. 27, 2001

(54) EXHAUST GAS RECIRCULATION SYSTEM IN AN INTERNAL COMBUSTION ENGINE

(75) Inventors: Gerald N. Coleman, Peoria; James J. Faletti, Spring Valley; Dennis D. Feucht, Morton; David A. Pierpont, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/706,481

(22) Filed: Nov. 3, 2000

(51) Int. Cl.$^7$ .................................................. F02B 33/44
(52) U.S. Cl. ................................................ 60/612; 60/605.1
(58) Field of Search ...................................... 60/605.1, 612

(56) References Cited
U.S. PATENT DOCUMENTS

| | | | | |
|---|---|---|---|---|
| 5,197,287 | * | 3/1993 | Okimoto et al. | 60/612 |
| 5,207,063 | * | 5/1993 | Blake | 60/612 |
| 5,277,029 | * | 1/1994 | Kidokoro et al. | 60/612 |

* cited by examiner

Primary Examiner—Hoang Nguyen
(74) Attorney, Agent, or Firm—Todd T. Taylor

(57) ABSTRACT

An exhaust gas recirculation system, particularly suitable for use in an internal combustion engine, is provided with a plurality of combustion cylinders, at least one exhaust manifold, and at least one intake manifold. Each exhaust manifold is coupled with a plurality of the combustion cylinders, and each intake manifold is coupled with a plurality of combustion cylinders. A first turbocharger includes a first turbine having at least one inlet and an outlet, and a first compressor having an inlet and an outlet. The at least one first turbine inlet is fluidly coupled with a corresponding exhaust manifold. A second turbocharger includes a second turbine having at least one inlet and an outlet, and a second compressor having an inlet and an outlet. The at least one second turbine inlet is fluidly coupled with a corresponding exhaust manifold. A valve assembly includes an inlet, a first outlet and a second outlet. The valve inlet is fluidly coupled with a corresponding first turbine inlet, the valve first outlet is fluidly coupled with the second turbine inlet, and the valve second outlet is fluidly coupled with at least one intake manifold.

24 Claims, 2 Drawing Sheets

EXHAUST GAS RECIRCULATION SYSTEM IN AN INTERNAL COMBUSTION ENGINE

TECHNICAL FIELD

The present invention relates to an exhaust gas recirculation system for use in an internal combustion engine, and, more particularly, to an exhaust gas recirculation system for use in an internal combustion engine having multiple turbochargers.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the compressed fluid to the combustion chambers. The fluid which is compressed by the compressor may be in the form of combustion air or a fuel and air mixture.

It is known to provide multiple turbochargers within a turbocharger system in an internal combustion engine. For example, U.S. Pat. No. 3,250,068 (Vulliamy) discloses an internal combustion engine having two turbochargers. A first turbocharger includes a turbine which is driven by a single exhaust manifold on the internal combustion engine. The spent exhaust gas from the turbine of the first turbocharger is transported in a series manner to the inlet of a turbine of the second turbocharger. The spent exhaust gas is then discharged to the ambient environment from the turbine of the second turbocharger. The compressor of the second turbocharger compresses ambient combustion air and provides the compressed combustion air in a series manner to the compressor of the first turbocharger, which in turn transports the compressed combustion air to the intake manifold of the engine.

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily recirculate the exhaust gas by-products into the intake air supply of the internal combustion engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the internal combustion engine.

With an EGR system as described above, it is known to control the amount of exhaust gas which is mixed with the combustion air for introduction into the intake manifold. Typically, a mixer such as a venturi-type mixer or the like is utilized to control the amount of exhaust gas which mixes with the combustion air. However, controlling the amount of exhaust gas which mixes with the combustion air using only a mixer may not be sufficient to provide fine adjustments to the combustion air to exhaust gas mixture ratio.

The present invention is directed to overcoming one or more of the problems as set forth above.

DISCLOSURE OF THE INVENTION

In one aspect of the invention, an internal combustion engine is provided with a plurality of combustion cylinders, at least one exhaust manifold, and at least one intake manifold. Each exhaust manifold is coupled with a plurality of the combustion cylinders, and each intake manifold is coupled with a plurality of combustion cylinders. A first turbocharger includes a first turbine having at least one inlet and an outlet, and a first compressor having an inlet and an outlet. The at least one first turbine inlet is fluidly coupled with a corresponding exhaust manifold. A second turbocharger includes a second turbine having at least one inlet and an outlet, and a second compressor having an inlet and an outlet. The at least one second turbine inlet is fluidly coupled with a corresponding exhaust manifold. A valve assembly includes an inlet, a first outlet and a second outlet. The valve inlet is fluidly coupled with a corresponding first turbine inlet, the valve first outlet is fluidly coupled with the second turbine inlet, and the valve second outlet is fluidly coupled with at least one intake manifold.

In another aspect of the invention, a method of recirculating exhaust gas in an exhaust gas recirculation system of an internal combustion engine is provided with the steps of: providing a first turbocharger including a first turbine having at least one inlet and an outlet, and a first compressor having an inlet and an outlet, the at least one first turbine inlet fluidly coupled with a corresponding exhaust manifold; providing a second turbocharger including a second turbine having at least one inlet and an outlet, and a second compressor having an inlet and an outlet, the at least one second turbine inlet fluidly coupled with a corresponding exhaust manifold; providing a valve assembly including an inlet, a first outlet, a first valve associated with the first outlet, a second outlet and a second valve associated with the second outlet, the valve inlet fluidly coupled with a corresponding exhaust manifold and the first turbine inlet, the valve first outlet fluidly coupled with the second turbine inlet, and the valve second outlet fluidly coupled with at least one intake manifold; and selectively opening and closing the valve first outlet and the valve second outlet.

BEST MODE FOR CARRYING OUT THE INVENTION

Figure 1:
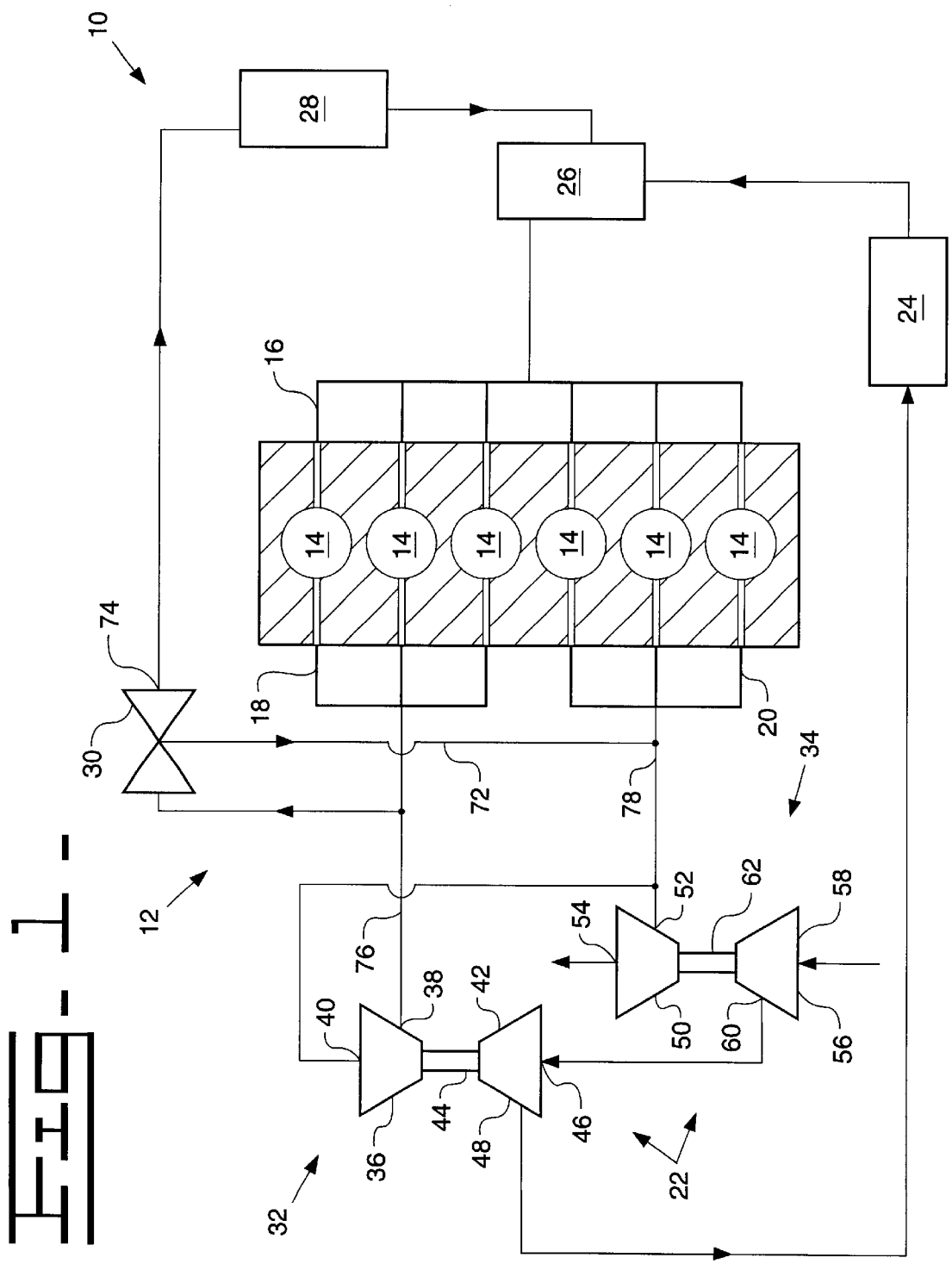
FIG. 1 is a schematic representation of an internal combustion engine, including an embodiment of an exhaust gas recirculation system of the present invention.

Referring now to the drawings, and more particularly to FIG. 1, there is shown an embodiment of an internal combustion engine 10 including an embodiment of an exhaust gas recirculation system 12 of the present invention.

Internal combustion engine 10 includes a plurality of combustion cylinders 14, such as the six combustion cylinders 14 shown in FIG. 1. A fuel, such as diesel fuel, is injected into each combustion cylinder 14 and combusted therein, in known manner.

Internal combustion engine 10 also includes at least one intake manifold 16, with each intake manifold being disposed in fluid communication with a plurality of combustion cylinders 14. In the embodiment shown, internal combustion engine 10 includes a single intake manifold 16 which is disposed in fluid communication with each of the six combustion cylinders 14. Intake manifold 16 provides an air mixture to each combustion cylinder 14, as will be described hereinafter.

Internal combustion engine 10 also includes at least one exhaust manifold, with each exhaust manifold being fluidly coupled with a plurality of combustion cylinders 14. In the embodiment shown, internal combustion engine 10 includes a first exhaust manifold 18 and a second exhaust manifold 20, with each exhaust manifold 18, 20 being fluidly coupled with three of the six combustion cylinders 14.

EGR system 12 includes a turbocharger system 22, aftercooler 24, mixer 26, EGR cooler 28 and valve assembly 30.

Turbocharger system 22 includes a first turbocharger 32 and a second turbocharger 34. First turbocharger 32 includes a first turbine 36 having at least one inlet 38 and an outlet 40. Inlet 38 is fluidly coupled with first exhaust manifold 18, and receives exhaust gas for rotatably driving a turbine wheel (not shown) disposed within first turbine 36. Inlet 38 may be configured as a fixed geometry inlet, or as a variable nozzle inlet, depending upon the particular application.

First turbocharger 32 also includes a first compressor 42 having a compressor wheel (not shown) therein which is mechanically coupled with and driven by the turbine wheel within first turbine 36 via shaft 44. First compressor 42 includes an inlet 46 and an outlet 48. First compressor 42 receives combustion air at inlet 46 and provides compressed combustion air at outlet 48.

Second turbocharger 34 includes a second turbine 50 having at least one inlet 52 and an outlet 54. Inlet 52 is fluidly coupled with each of second exhaust manifold 20 and first turbine outlet 40. Thus, second turbine 50 receives exhaust gas directly from second exhaust manifold 20, and receives exhaust gas indirectly from first exhaust manifold 18 via first turbine 36. In the embodiment shown, second turbine 50 includes a single inlet 52 which receives exhaust gas from each of second exhaust manifold 20 and first turbine outlet 40. However, it is also possible to configure second turbine 50 with separate inlets which receive exhaust gas from second exhaust manifold 20 and first turbine outlet 40 in a parallel manner. Each inlet may be configured as a fixed geometry inlet, or as a variable geometry nozzle, dependent upon the specific application. Second turbine outlet 54 discharges the spent exhaust gas to the ambient environment via an exhaust system (not shown).

Second turbocharger 34 also includes a second compressor 56 having an inlet 58 and an outlet 60. Second compressor 56 includes a compressor wheel (not shown) which is mechanically coupled and driven by the turbine wheel within second turbine 50 via shaft 62. Second compressor 56 receives combustion air from the ambient environment at inlet 58, and discharges compressed combustion air at outlet 60. Outlet 60 is fluidly coupled with first compressor inlet 46 in a series manner. Thus, second compressor 56 and first compressor 42 define a two-stage compressor for compressing ambient combustion air.

According to an aspect of the present invention, valve assembly 30 of EGR system 12 functions both to regulate exhaust gas flow which is mixed with the combustion air transported to intake manifold 16, as well as provide exhaust gas to second turbine 50. Controlling or regulating the amount of exhaust gas which is transported to intake manifold 16 provides effective exhaust gas recirculation system within internal combustion engine 10. Moreover, controlling a flow of exhaust gas to second turbine 50 utilizes energy from the exhaust gas which is not transported to intake manifold 16 to drive second turbine 50.

Figure 2:
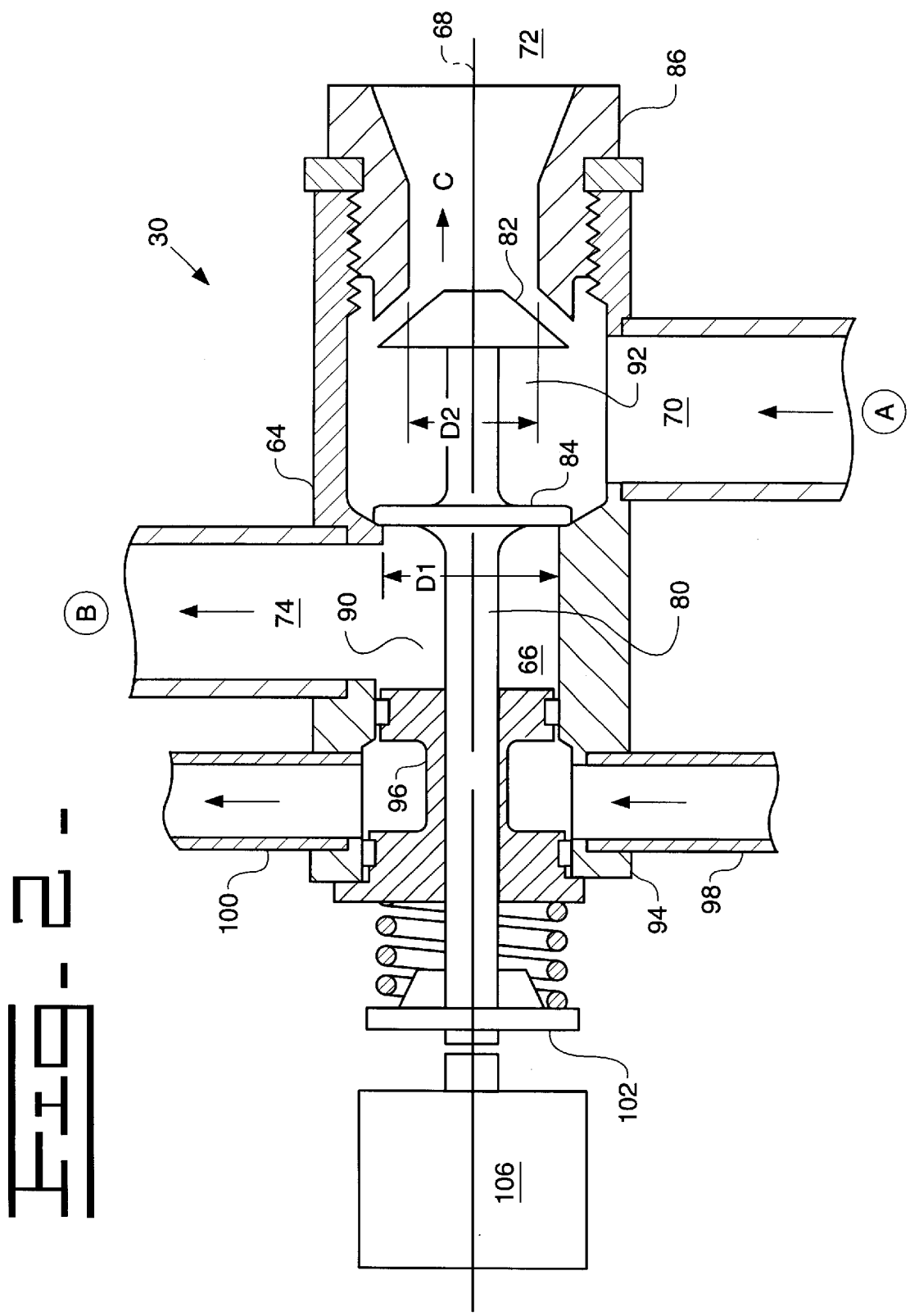
FIG. 2 is a side, sectional view of the valve assembly shown in FIG. 1.

More particularly, referring to FIG. 2, valve assembly 30 includes a body 64 having a longitudinal bore 66 with a longitudinal axis 68. Body 64 includes an inlet 70, first outlet 72 and second outlet 74. Inlet 70 extends generally perpendicular to longitudinal axis 68 of bore 66, and is fluidly coupled with fluid line 76 interconnecting first exhaust manifold 18 and first turbine inlet 38. Valve inlet 70 thus receives exhaust gas from first exhaust manifold 18 in a parallel flow manner.

Valve first outlet 72 is positioned generally coaxially with longitudinal axis 68 of bore 66, and is fluidly coupled with fluid line 78 interconnecting second exhaust manifold 20 and second turbine inlet 52. Valve second outlet 74 is positioned generally perpendicular to longitudinal axis 68 of bore 66, and is fluidly coupled with intake manifold 16.

A shaft 80 is slidably positioned within bore 66. A first valve 82 is carried by shaft 80 in association with first valve outlet 72; and a second valve 84 is carried by shaft 80 in association with valve second outlet 74. In the embodiment shown, first valve 82 and second valve 84 are monolithically formed with shaft 80, but may also be separately formed and carried by shaft 80. First valve 82 and second valve 84 each have a predetermined configuration allowing first valve outlet 72 and second valve outlet 74 to be selectively opened and closed, while at the same time providing desired fluid flow characteristics to the exhaust gas flowing from first valve 72 and/or second valve 74. In the embodiment shown, first valve 82 has a generally frustroconical shape and second valve 84 has a generally disc shape.

First valve 82 is movable relative to an insert 86 defining first valve outlet 72. Insert 86 is removably attached to body 64 to provide first outlet 72 with a predetermined interior configuration. In the embodiment shown, insert 86 has a diverging surface 88 providing gas expansion and pressure rise at the discharge side of first outlet 72. The generally frustroconical shape of first valve 82 assists in defining a venturi within insert 86. Thus, the exhaust gas flow accelerates under reduced pressure past first valve 82, and expands at an increasing pressure at the discharge side of insert 86.

Second valve 84 has a generally disc shape which defines an annular opening relative to body 64 when second valve 84 is positioned to allow exhaust gas to flow to second valve outlet 74. Bore 66 of body 64 is configured with a diameter 90 which is larger than a diameter 92 within a throat region of insert 86. The ratio between diameter 90 and diameter 92 may be selected to provide a desired volumetric flow rate from each of valve first outlet 72 and valve second outlet 74. The values of diameter 90 and diameter 92 may vary from one application to another, and may be relatively easily empirically determined.

A valve guide 94 is carried within bore 66 of body 64, and slidably carries shaft 80 within bore 66. Valve guide 94 includes a circumferencial groove 96 defining a fluid channel which is in fluid communication with a water inlet 98 and a water outlet 100. Valve assembly 30 is thus water cooled to remove heat generated by the exhaust gas flowing therethrough.

A collet 102 is affixed to shaft 80 at a distance away from valve guide 94. A compression spring 104 exerts opposite axial forces against each of valve guide 94 and collet 102, and thereby biases second valve 84 to a position closing valve second outlet 74, as shown in FIG. 2.

An actuator 106 is coupled with and selectively moves shaft 80 at or between a first position wherein first valve 82 closes valve first outlet 72, and a second position (FIG. 2)

wherein second valve 84 closes valve second outlet 74, or any selected position therebetween. Actuator 106 may be in the form of a mechanical actuator which moves shaft 80 based upon, e.g., pressure differentials at selected locations; or may be in the form of an electrical actuator such as a solenoid. In the embodiment shown, actuator 106 is in the form of an electrical actuator which moves shaft 80 to and between the first position closing valve first outlet 72 and the second position closing valve second outlet 74.

Aftercooler 24 cools the compressed combustion air which exits first compressor outlet 48; and EGR cooler 28 cools the exhaust gas which flows from second outlet 74 of valve 30. Mixer 26 mixes exhaust gas with combustion air. Aftercooler 24, mixer 26 and EGR cooler 28 may each be of conventional design, and thus are not described further.

INDUSTRIAL APPLICABILITY

During use, fuel such as diesel fuel is injected into each combustion cylinder 14 and combusted therein. Exhaust gas flows from first exhaust manifold 18 to first turbine 36 for rotatably driving first turbine 36. Concurrently, exhaust gas from first exhaust manifold 18 flows in a parallel manner to inlet 70 of valve assembly 30. Spent exhaust gas from first turbine 36 is mixed with exhaust gas from second exhaust manifold 20, and fed to second turbine 50 for rotatably driving second turbine 50. The spent exhaust gas from second turbine 50 is discharged to the ambient environment. First compressor 42 and second compressor 56 are each rotatably driven by first turbine 36 and second turbine 50, respectively. Ambient combustion air is drawn into second compressor 56 and compressed therein. The compressed combustion air is discharged from second compressor 56 in a series manner to first compressor 42 to provide two-stage compression of the combustion air. The compressed combustion air is then cooled within aftercooler 24 and transported to mixer 26.

Valve 30 is selectively actuated to control the flow of exhaust gas from valve first outlet 72 and/or valve second outlet 74. Exhaust gas flowing from valve first outlet 72 mixes with exhaust gas from second exhaust manifold 20 and flows to second turbine inlet 52. Exhaust gas from valve second outlet 74 is cooled within EGR cooler 28 and then transported to mixer 26 for mixing with the combustion air. The mixture of combustion air and exhaust gas is then transported to intake manifold 16.

The present invention provides an EGR system 12 which may be utilized in conjunction with a turbocharger system 22 having a first turbocharger 32 and a second turbocharger 34. The amount of exhaust gas which is transported from valve first outlet 72 and/or valve second outlet 74 may be controlled by providing bore 66 and/or valves 82, 84 with a selected size and/or shape. The valves are selectively, partially or entirely opened and closed using either a mechanical or an electrical actuator, thereby providing flexibility for implementation of EGR system 12. The particular size and shape of bore 66 and valves 82, 84 may be selected dependent upon a particular application, and may be easily empirically determined from one application to another.

Other aspects, objects and advantages of this invention can be obtained from a study of the drawings, the disclosure and the appended claims.

What is claimed is:

1. An internal combustion engine, comprising:
    a plurality of combustion cylinders;
    at least one exhaust manifold, each said exhaust manifold coupled with a plurality of said combustion cylinders;
    at least one intake manifold, each said intake manifold coupled with a plurality of said combustion cylinders;
    a first turbocharger including a first turbine having at least one inlet and an outlet, and a first compressor having an inlet and an outlet, said at least one first turbine inlet fluidly coupled with a corresponding said exhaust manifold;
    a second turbocharger including a second turbine having at least one inlet and an outlet, and a second compressor having an inlet and an outlet, said at least one second turbine inlet fluidly coupled with a corresponding said exhaust manifold; and
    a valve assembly including an inlet, a first outlet and a second outlet, said valve inlet fluidly coupled with a corresponding said first turbine inlet, said valve first outlet fluidly coupled with said second turbine inlet, and said valve second outlet fluidly coupled with at least one said intake manifold.

2. The internal combustion engine of claim 1, said valve including a body with a longitudinal bore, a shaft positioned within said bore, a first valve carried by said shaft in association with said valve first outlet, and a second valve carried by said shaft in association with said valve second outlet.

3. The internal combustion engine of claim 2, said shaft being monolithic with said first valve and said second valve.

4. The internal combustion engine of claim 2, said valve first outlet having a generally frustroconical shape and said valve second outlet having a generally disc shape.

5. The internal combustion engine of claim 2, including an actuator for selectively moving said shaft to and between a first position wherein said first valve closes said valve first outlet, and a second position wherein said second valve closes said valve second outlet.

6. The internal combustion engine of claim 5, said actuator being one of a mechanical actuator and an electrical actuator.

7. The internal combustion engine of claim 2, including a spring biasing said shaft to a first position wherein said second valve closes said valve second outlet.

8. The internal combustion engine of claim 2, said bore having a first diameter adjacent said valve first outlet and a second diameter adjacent said valve second outlet, said second diameter being larger than said first diameter.

9. The internal combustion engine of claim 8, said valve first outlet having a diverging surface.

10. The internal combustion engine of claim 9, said valve having an insert at said first outlet defining said diverging surface.

11. The internal combustion engine of claim 2, said valve inlet and said valve second outlet extending generally perpendicular to a longitudinal axis of said bore, and said valve first outlet extending generally coaxially with said longitudinal axis of said bore.

12. An exhaust gas recirculation system in an internal combustion engine including a plurality of combustion cylinders, at least one exhaust manifold, and at least one intake manifold, said exhaust gas recirculation system comprising:
    a first turbocharger including a first turbine having at least one inlet and an outlet, and a first compressor having an inlet and an outlet, said at least one first turbine inlet fluidly coupled with a corresponding said exhaust manifold;
    a second turbocharger including a second turbine having at least one inlet and an outlet, and a second compressor having an inlet and an outlet, said at least one second turbine inlet fluidly coupled with a corresponding said exhaust manifold; and a valve assembly including an inlet, a first outlet and a second outlet, said valve inlet fluidly coupled with a corresponding said first turbine inlet, said valve first outlet fluidly coupled with said second turbine inlet, and said valve second outlet fluidly coupled with at least one said intake manifold.

13. The exhaust gas recirculation system of claim 12, said valve including a body with a longitudinal bore, a shaft positioned within said bore, a first valve carried by said shaft in association with said valve first outlet, and a second valve carried by said shaft in association with said valve second outlet.

14. The exhaust gas recirculation system of claim 13, said shaft being monolithic with said first valve and said second valve.

15. The exhaust gas recirculation system of claim 13, said valve first outlet having a generally frustroconical shape and said valve second outlet having a generally disc shape.

16. The exhaust gas recirculation system of claim 13, including an actuator for selectively moving said shaft to and between a first position wherein said first valve closes said valve first outlet, and a second position wherein said second valve closes said valve second outlet.

17. The exhaust gas recirculation system of claim 16, said actuator being one of a mechanical actuator and an electrical actuator.

18. The exhaust gas recirculation system of claim 13, including a spring biasing said shaft to a first position wherein said second valve closes said valve second outlet.

19. The exhaust gas recirculation system of claim 13, said bore having a first diameter adjacent said valve first outlet and a second diameter adjacent said valve second outlet, said second diameter being larger than said first diameter.

20. The exhaust gas recirculation system of claim 19, said valve first outlet having a diverging surface.

21. The exhaust gas recirculation system of claim 20, said valve having an insert at said first outlet defining said diverging surface.

22. The exhaust gas recirculation system of claim 13, said valve inlet, said valve first outlet and said valve second outlet extending generally perpendicular to said bore.

23. A method of recirculating exhaust gas in an exhaust gas recirculation system of an internal combustion engine, comprising the steps of:

providing a first turbocharger including a first turbine having at least one inlet and an outlet, and a first compressor having an inlet and an outlet, said at least one first turbine inlet fluidly coupled with a corresponding said exhaust manifold;

providing a second turbocharger including a second turbine having at least one inlet and an outlet, and a second compressor having an inlet and an outlet, said at least one second turbine inlet fluidly coupled with a corresponding said exhaust manifold; and providing a valve assembly including an inlet, a first outlet, a first valve associated with said first outlet, a second outlet and a second valve associated with said second outlet, said valve inlet fluidly coupled with a corresponding said exhaust manifold and said first turbine inlet, said valve first outlet fluidly coupled with said second turbine inlet, and said valve second outlet fluidly coupled with at least one said intake manifold; and selectively opening and closing said valve first outlet and said valve second outlet.

24. The method of claim 23, said valve including a body with a longitudinal bore and a shaft positioned within said bore, said first valve carried by said shaft in association with said valve first outlet, and said second valve carried by said shaft in association with said valve second outlet, and including the step of selectively moving said shaft to and between a first position wherein said first valve closes said valve first outlet and a second position wherein said second valve closes said valve second outlet.

* * * * *